United States Patent
Joo et al.

(10) Patent No.: US 8,057,066 B2
(45) Date of Patent: Nov. 15, 2011

(54) BACKLIGHT ASSEMBLY WITH IMPROVED BRIGHTNESS UNIFORMITY AND DISPLAY APPARATUS HAVING THE SAME

(75) Inventors: Byung-Yun Joo, Seoul (KR);
Min-Young Song, Seoul (KR);
Sang-Hoon Lee, Cheonan-si (KR);
Dong-Kwan Kim, Seoul (KR);
Jin-Sung Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 365 days.

(21) Appl. No.: 12/506,963

(22) Filed: Jul. 21, 2009

(65) Prior Publication Data

US 2010/0046202 A1 Feb. 25, 2010

(30) Foreign Application Priority Data

Aug. 21, 2008 (KR) .................................. 2008-81970

(51) Int. Cl.
*F21V 5/00* (2006.01)
(52) U.S. Cl. .. 362/246; 362/97.1; 362/307; 362/311.01; 362/326; 362/614
(58) Field of Classification Search ........ 362/97.1–97.2, 362/227, 235, 246, 257, 307–308, 311.01, 362/326, 330, 608, 613–614; 349/58
See application file for complete search history.

(56) References Cited

U.S. PATENT DOCUMENTS

| 2004/0022050 A1* | 2/2004 | Yamashita et al. ............. 362/31 |
| 2007/0110386 A1 | 5/2007 | Chiang |
| 2008/0002098 A1 | 1/2008 | Imajo et al. |
| 2008/0180599 A1 | 7/2008 | Ha et al. |

FOREIGN PATENT DOCUMENTS

| JP | 07261029 A | 10/1995 |
| JP | 2005-117023 A | 4/2005 |
| JP | 2005-352400 A | 12/2005 |
| KR | 1020000043518 A | 7/2000 |
| WO | 2008061059 A3 | 5/2008 |

* cited by examiner

*Primary Examiner* — Stephen F Husar
*Assistant Examiner* — Meghan Dunwiddie
(74) *Attorney, Agent, or Firm* — Innovation Counsel LLP

(57) ABSTRACT

A backlight assembly and a display apparatus having the backlight assembly are disclosed. A diffusion plate is provided above a plurality of lamps. Diffusion patterns that cause contrast inversion and diffusion patterns that do not cause contrast inversion are arranged on a surface of a diffusion plate, in an alternating manner along a longitudinal direction of the lamps. Thus, a brightness difference between a first area in which the lamps are positioned and a second area between two adjacent lamps is reduced, thereby improving a brightness uniformity of light from the backlight assembly.

20 Claims, 6 Drawing Sheets

BACKLIGHT ASSEMBLY WITH IMPROVED BRIGHTNESS UNIFORMITY AND DISPLAY APPARATUS HAVING THE SAME

CROSS-REFERENCE TO RELATED APPLICATION

This application relies for priority upon Korean Patent Application No. 2008-81970, filed on Aug. 21, 2008, the content of which is herein incorporated by reference in its entirety.

BACKGROUND

1. Field of the Invention

The present invention relates to a backlight assembly and a display apparatus having the same. More particularly, the present invention relates to a backlight assembly capable of reducing overall device thickness and improving brightness uniformity, and a display apparatus having the backlight assembly.

2. Description of the Related Art

In general, a liquid crystal display (LCD) is a display apparatus that uses optical characteristics of liquid crystal cells to display images. Since LCD is a non-emissive device, it displays an image by receiving light from a backlight assembly provided behind a rear surface of a liquid crystal display panel.

The backlight assembly is classified into a direct-illumination type backlight assembly and an edge-illumination type backlight assembly according to the position of the light source. The direct-illumination type backlight assembly directly irradiates the whole surface of the liquid crystal display panel by using a light source positioned behind the liquid crystal display panel. The direct-illumination type backlight assembly typically includes a plurality of light sources to ensure higher brightness as compared with that of the edge-illumination type backlight assembly.

The direct-illumination type backlight assembly includes one or more lamps emitting light, and a diffusion plate provided in front of the lamps to diffuse the light emitted from the lamps. One disadvantage of the direct-illumination type backlight assembly is that its light has non-uniform brightness distribution. In other words, the area of the backlight assembly that is close to (e.g., overlaps) the lamp is brighter than the area of the backlight assembly that is not as close to the lamp (e.g., between two adjacent lamps). Such non-uniform brightness distribution degrades brightness uniformity of light from the direct-illumination type backlight assembly.

SUMMARY

Therefore, an exemplary embodiment of the present invention provides a backlight assembly capable of reducing a whole thickness and improving brightness uniformity thereof.

Another exemplary embodiment of the present invention also provides a display apparatus having the backlight assembly.

In an exemplary embodiment of the present invention, a backlight assembly includes a plurality of lamps and a diffusion plate. The lamps are arranged to emit light. The diffusion plate is provided to receive and diffuse the light emitted from the lamps, and has a first area and a second area, the first area overlapping the lamps and the second area overlapping the space between the lamps. The diffusion plate includes first diffusion patterns and second diffusion patterns.

The first diffusion patterns are formed at a first density in the first area and at a second density in the second area. The second density is lower than the first density. The second diffusion patterns are formed at a third density in the first area, and at a fourth density lower than the third density in the second area. In this case, a ratio of the first density to the second density is different from a ratio of the third density to the fourth density.

In another aspect, the present invention is a display apparatus that includes a display panel and a backlight assembly. The display panel displays an image using light. The backlight assembly is provided behind the display panel to supply the light to the display panel. The backlight assembly includes a plurality of lamps and a diffusion plate. The lamps are arranged to emit the light. The diffusion plate is provided to receive and diffuse the light emitted from the lamps, and has a first area and a second area. The first area overlaps the lamps and the second area overlaps the space between the lamps. The diffusion plate includes first diffusion patterns and second diffusion patterns. The first diffusion patterns are formed on the diffusion plate to have a first density in the first area and a second density lower than the first density in the second area. The second diffusion patterns are formed on the diffusion plate to have a third density in the first area and a fourth density lower than the third density in the second area. In this case, a ratio of the first density to the second density is different from a ratio of the third density to the fourth density.

Diffusion patterns that cause contrast inversion and diffusion patterns that do not cause contrast inversion are arranged on a surface of the diffusion plate that faces the lamps, in an alternating manner along a longitudinal direction of the lamps.

Accordingly, a brightness difference between the first area and the second area can be reduced, thereby improving a brightness uniformity of the light emitted from the backlight assembly.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Hereinafter, preferred embodiments of the present invention will be described in more detail with reference to accompanying drawings.

Figure 1:
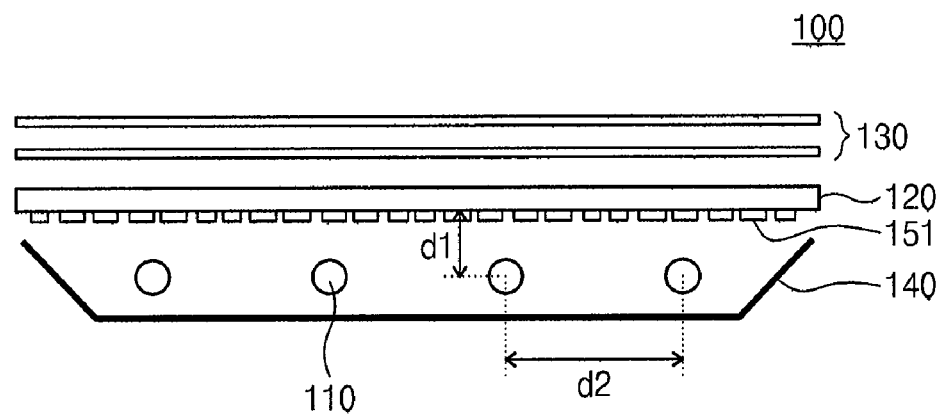
FIG. 1 is a sectional view showing an exemplary embodiment of a backlight assembly according to the present invention.
Figure 2:
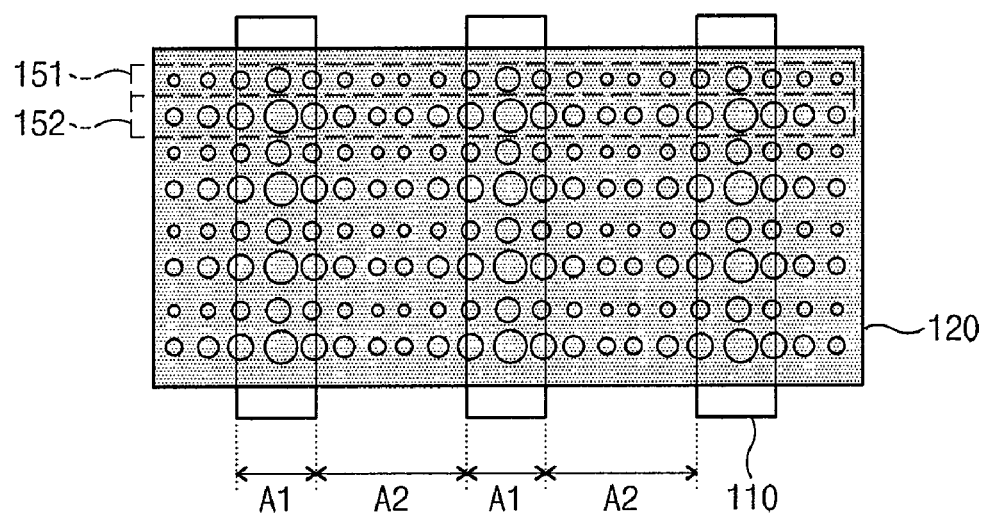
FIG. 2 is a plan view showing the backlight assembly shown in FIG. 1.

FIG. 1 is a sectional view showing an exemplary embodiment of a backlight assembly according to the present invention, and FIG. 2 is a schematic plan view of a diffusion plate showing a density of first and second printed patterns.

Referring to FIGS. 1 and 2, a backlight assembly 100 includes a plurality of lamps 110, a diffusion plate 120, optical sheets 130, and a reflective plate 140.

The lamps 110 are spaced apart from each other by a predetermined interval, and arranged parallel to each other. Each lamp 110 may include a cold-cathode tube fluorescent lamp. The diffusion plate 120 is provided above the lamps 110 to diffuse and output the light from the lamps 110 through a bottom surface of the diffusion plate 120.

The diffusion plate 120 is divided into a first area A1 that receives a greater amount of light and a second area A2 that receives less light. In detail, in the diffusion plate 120, the first area A1 in which the lamp 110 is positioned receives a lot of light, and the second area A2 between two adjacent lamps 110 receives less light.

A brightness difference between the first and second areas A1 and A2 changes according to a ratio of a second distance d2 to a first distance d1. As shown in FIG. 1, the first distance d1 represents a distance between the bottom surface of the diffusion plate 120 and a center of the lamp 110, and the second distance d2 represents a distance between the centers of the two adjacent lamps 110. In other words, if the ratio of the second distance d2 to the first distance d1 is increased, the brightness difference between the first and second areas A1 and A2 is increased. Accordingly, brightness uniformity of the backlight assembly 100 is deteriorated.

However, recently, the backlight assembly 100 has become thinner, thereby placing a physical limit on the first distance d1. As a result, the second distance d2 between the centers of the two adjacent lamps 110 has increased to be at least about four times the first distance d1 between the bottom surface of the diffusion plate 120 and the center of the lamp 110.

In order to reduce the brightness difference of light from the first and second areas A1 and A2 even if the ratio of the second distance d2 to the first distance d1 is increased, first and second diffusion patterns 151 and 152 are provided on the bottom surface of the diffusion plate 120 according to the present exemplary embodiment. The first and second diffusion patterns 151 and 152 include a white ink including titanium dioxide ($TiO_2$), and are substantially simultaneously printed on the bottom surface of the diffusion plate 120. The first and second diffusion patterns 151 and 152 are arranged in an alternating manner on the bottom surface of the diffusion plate 120 along a longitudinal direction of the lamps 110.

The first diffusion patterns 151 have a first density in the first area A1, and have a second density lower than the first density in the second area A2. The second diffusion patterns 152 have a third density in the first area A1, and have a fourth density lower than the third density in the second area A2. As used herein, "density" refers to the area that is occupied by the diffusion patterns per unit area of the diffusion plate 120.

The ratio of the first density to the second density is different from the ratio of the third density to the fourth density. In the present exemplary embodiment, the ratio of the first density to the second density may be less than the ratio of the third density to the fourth density.

Meanwhile, the optical sheets 130 are provided above the diffusion plate 120 to diffuse and condense the light from the diffusion plate 120, so that brightness uniformity, a view angle, and front brightness can be improved. Thus, the light having improved characteristics, such as the brightness uniformity, the view angle, and the front brightness, is supplied to a display panel (not shown) due to the optical sheets 300.

The reflective plate 140 is provided behind the lamps 110 to reflect light leaking from the lamps 110 to the diffusion plate 120, so that optical efficiency of the backlight assembly 100 can be improved. The reflective plate 140 includes a reflective material (e.g., aluminum (A1)) having high reflectance. In addition, both ends of the reflective plate 140 are bent toward the diffusion plate 120 to effectively reflect light emitted from outermost lamps of the lamps 110 to the diffusion plate 120. Accordingly, brightness degradation may be prevented along the edges of the diffusion plate 120 that extend parallel to the lamps 110.

Figure 3:
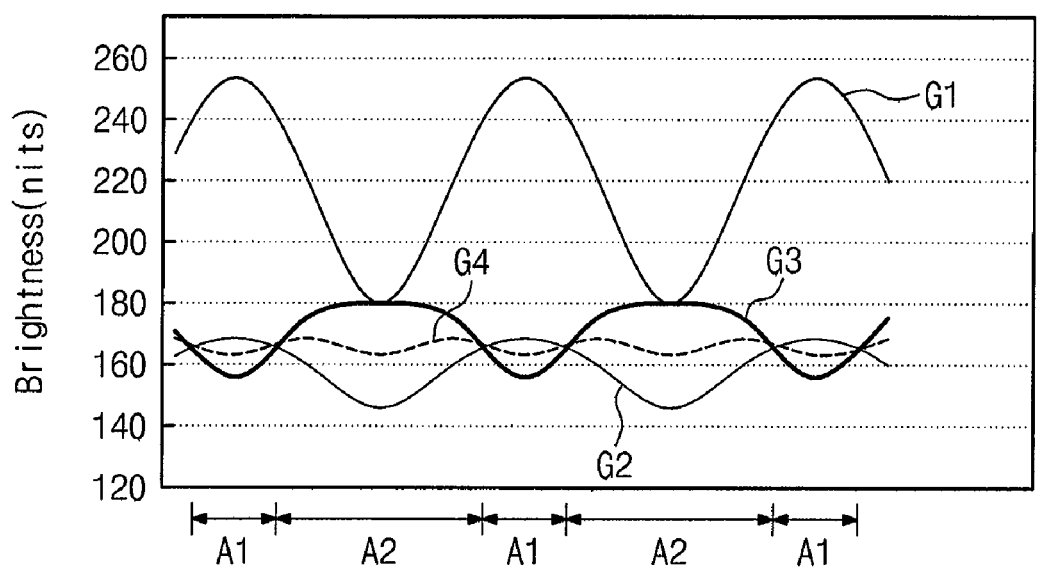
FIG. 3 is a graph showing brightness distribution in first and second areas shown in FIG. 2.

FIG. 3 is a graph diagram showing brightness distribution in the first and second areas A1 and A2 shown in FIG. 2.

In FIG. 3, a first curve G1 represents brightness distribution of light before the light passes through the diffusion plate 120, and a second curve G2 represents brightness distribution of light after the light has passed through the diffusion plate 120 having the first diffusion patterns 151. A third curve G3 represents brightness distribution of light after the light has passed through the diffusion plate 120 having the second diffusion patterns 152, and a fourth curve G4 represents brightness distribution of light after the light that has passed through the diffusion plate 120 having the first and second diffusion patterns 151 and 152 that are alternately arranged. Referring to the first curve G1, before the light passes through the diffusion plate 120, the light has brightness distribution in the form of a sine wave. In detail, the highest brightness of the light is shown at the center of the first area A1 in which the lamp 110 is positioned, and the lowest brightness of the light is shown at the center of the second area A2 between the two adjacent lamps 110. Before the light passes through the diffusion plate 120, it has brightness distribution in the range of about 180, nits to about 260, nits higher than that of the light that has passed through the diffusion plate 120. In addition, before the light passes through the diffusion plate 120, it has brightness difference between the center of the first area A1 and the center of the second area A2 is about 70, nits.

Referring to the second curve G2, the light that has passed through the diffusion plate 120 having the first diffusion pattern 151 has brightness distribution in the form of a sine wave. In other words, the highest brightness of the light is shown at the center of the first area A1 in which the lamp 110 is positioned, and the lowest brightness of the light is shown at the center of the second area A2 between two adjacent lamps 110. Accordingly, when the brightness of the light is measured from above the diffusion plate 120 having the first diffusion pattern 151, the brightness of the light in the second area A2 is lower than brightness of the light in the first area A1 above the diffusion plate 120 having the first diffusion pattern 151.

In the case of the first diffusion patterns 151, since the difference between the first density and the second density does not exceed a threshold ratio, contrast inversion does not occur. "Contrast inversion" is when the light in the second area A2 becomes brighter than the light in the first area A1. If the first density is not sufficiently different from the second density, the ratio of the first density to the second density is lower than the threshold ratio for contrast inversion to happen.

Comparing the first curve G1 to the second curve G2, it can be seen that the light that passed through the diffusion plate 120 has a brightness distribution that is about 140, nits to about 180, nits lower than the brightness distribution obtained before the light passed through the diffusion plate 120. Examining the fourth curve G2, it can also be seen that the brightness difference between the center of the first area A1 and the center of the second area A2 is only about 20, nits lower than the brightness difference obtained before the light passed through the diffusion plate 120.

Meanwhile, referring to the third curve G3, the light that has passed through the diffusion plate 120 having the second diffusion patterns 152 has the lowest brightness at the center of the first area A1 in which the lamp 110 is positioned, and has the highest brightness at the center of the second area A2 between the two adjacent lamps 110. In other words, when the brightness of the light is measured from above the diffusion plate 120 having the second diffusion pattern 152, the brightness in the first area A1 is lower than the brightness in the second area A2 above the diffusion plate 120 having the second diffusion pattern 152. This inversion in the relative brightness of the first area A1 and the second area A2 indicates that contrast inversion has occurred.

As shown in FIG. 2, in the case of the second diffusion patterns 152, since the difference between the third density and the fourth density exceeds the threshold ratio, light emitted from the first area A1 is significantly diffused. Accordingly, contrast inversion, in which the brightness in the second area A2 becomes higher than the brightness in the first area A1, occurs.

However, as shown in FIG. 2, if the first and second diffusion patterns 151 and 152 are alternately arranged on the diffusion plate 120 along the longitudinal direction of the lamps 110, the light that has passed through the diffusion plate 120 has brightness distribution in the form of the fourth curve G4. The fourth curve G4 is based on an average of the second curve G2 and the third curve G3. As a result, the brightness difference between the center of the first area A1 and the center of the second area A2 is reduced to about 10, nits, and the brightness uniformity of the light that has passed through the diffusion plate 120 can be improved.

As shown in FIG. 3, since the light exiting from the diffusion plate 120 having the first diffusion patterns 151 or the second diffusion patterns 152 has the brightness distribution in the form of a sine wave, the density of the first and second diffusion patterns 151 and 152 can be defined as a sine function shown in Equation 1.

$$Y = \sin\left(\frac{2\pi}{R_{period}}(x - R_{phase})\right) \qquad \text{Equation 1}$$

In Equation 1,, the $R_{period}$, is a period random value of the sine wave, and the $R_{phase}$, is a phase random value of the sine wave. In the present exemplary embodiment, a range of the period random value $R_{period}$, may have 0.1, to 0.2. When assuming that the period random value $R_{period}$, is set to 0.1, and a period of the sine wave is set to "α", the period of the sine wave may be randomly varied in a range of "−(0.1×α)" to "+(0.1×α)". Also, when assuming that the phase random value $R_{phase}$, is set to 0.2, and a phase of the sine wave is set to "β", the phase of the sine wave may be randomly varied in a range of "(0.2×β)" to "+(0.2×β)".

The density of the first and second diffusion patterns 151 and 152 is adjusted according to the period random value $R_{period}$, and the ratio ($R_{phase}/R_{period}$) of the phase random value $R_{phase}$, to the period random value $R_{period}$.

Figure 4:
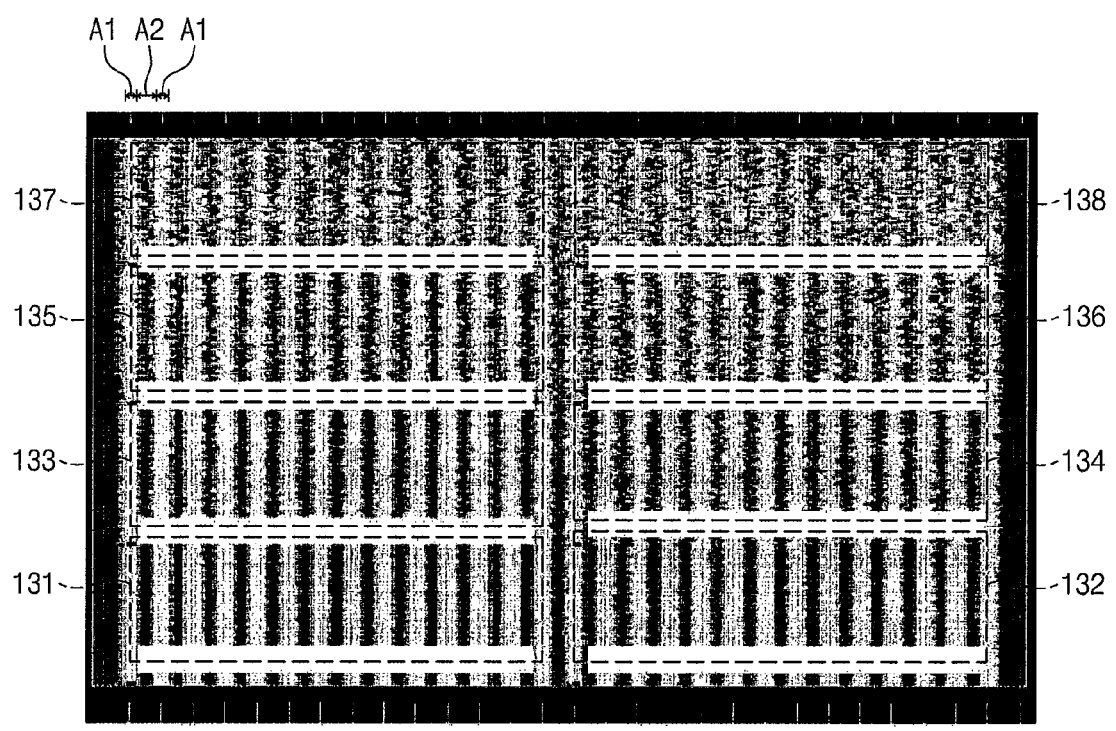
FIG. 4 is a view showing a density of printed patterns according to a ratio of a phase random value to a period random value.

FIG. 4 is a view showing the density of printed patterns according to the ratio of the phase random value to the period random value.

In particular, FIG. 4 shows the density of the printed patterns when the phase random value is increased in order of 0.0, 0.4, 0.8, 1.2, 1.6, 2.0, 2.4,, and 2.8, in a state in which the period random value is fixed to 0.1. In detail, as shown in FIG. 4, a first block 131 represents the density of the printed patterns when the ratio of phase random value to the period random value is 0,, and a second block 132 represents the density of the printed patterns when the ratio of the phase random value to the period random value is 4. A third block 133 represents the density of the printed patterns when the ratio of the phase random value to the period random value is 8,, and a fourth block 134 represents the density of the printed patterns when the ratio of the phase random value to the period random value is 12. A fifth block 135 represents the density of the printed patterns when the ratio of the phase random value to the period random value is 16,, and a sixth block 136 represents the density of the printed patterns when the ratio of the phase random value to the period random value is 20. In addition, a seventh block 137 represents the density of the printed patterns when the ratio of the phase random value to the period random value is 24,, and an eighth block 138 represents the density of the printed patterns when the ratio of the phase random value to the period random value is 28.

In addition, a white portion of the first to eighth blocks 131 to 138 of FIG. 4 represents an area in which the density of the printed patterns is relatively high, and a black portion of the first to eighth blocks 131 to 138 represents an area in which the density of the printed pattern is relatively low.

As shown in FIG. 4, as the ratio of the phase random value to the period random value is reduced from 28, to 0,, the white portion is concentrated in the first area A1 in which the lamp 110 is positioned, and the black portion is concentrated in the second area A2 between the two adjacent lamps 110. Therefore, as the ratio of the phase random value to the period random value is reduced, the probability for the contrast inversion in which the brightness in the second area A2 becomes higher than the brightness in the first area A1 may be increased.

On the contrary, as the ratio of the phase random value to the period random value is increased from 0, to 28,, the white portion is less concentrated in the first area A1 and dispersed into the second area A2. Accordingly, if the ratio of the phase random value to the period random value is increased, the probability for the contrast inversion in which the brightness in the second area A2 becomes higher than the brightness in the first area A1 may be decreased.

In the present exemplary embodiment, the ratio of the phase random value to the period random value, which causes the contrast inversion, is selected by measuring the brightness of the light from the diffusion plate 120 while gradually reducing the ratio of the phase random value to the period random value from 28, to 0. If the threshold value for the ratio of the phase random value to the period random value, which causes the contrast inversion, is determined, the printed patterns having a value smaller than the threshold value are selected as the second diffusion patterns 152, and the printed patterns having a value larger than the threshold value are selected as the first diffusion pattern 151.

Figure 5A:
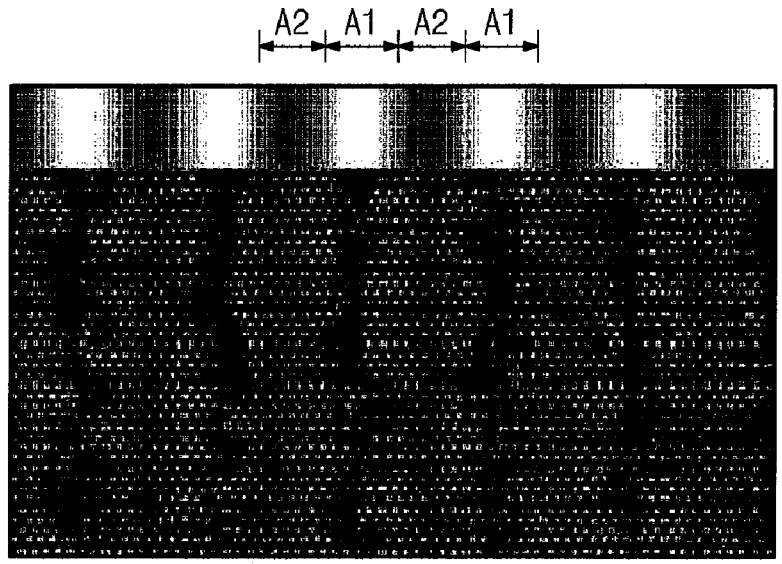
FIG. 5A is a view showing a simulation for second diffusion patterns causing a contrast inversion.
Figure 5B:
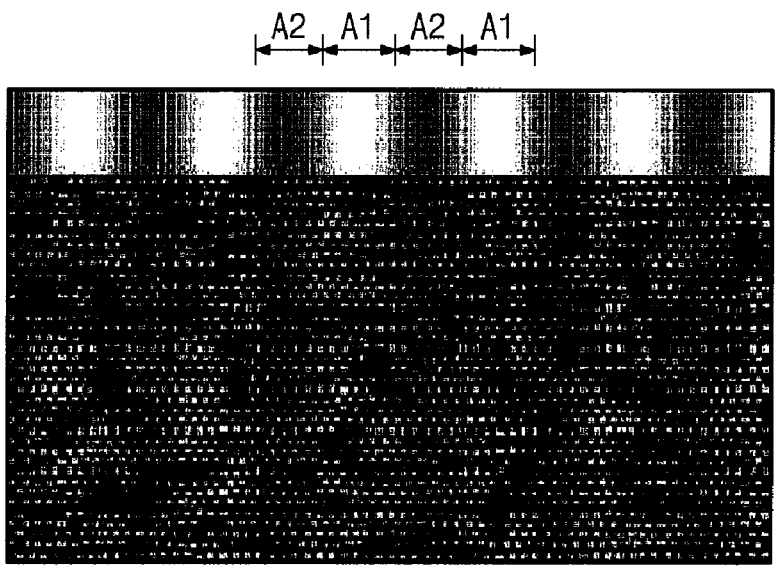
FIG. 5B is a view showing a simulation for first diffusion patterns that do not cause the contrast inversion.
Figure 5C:
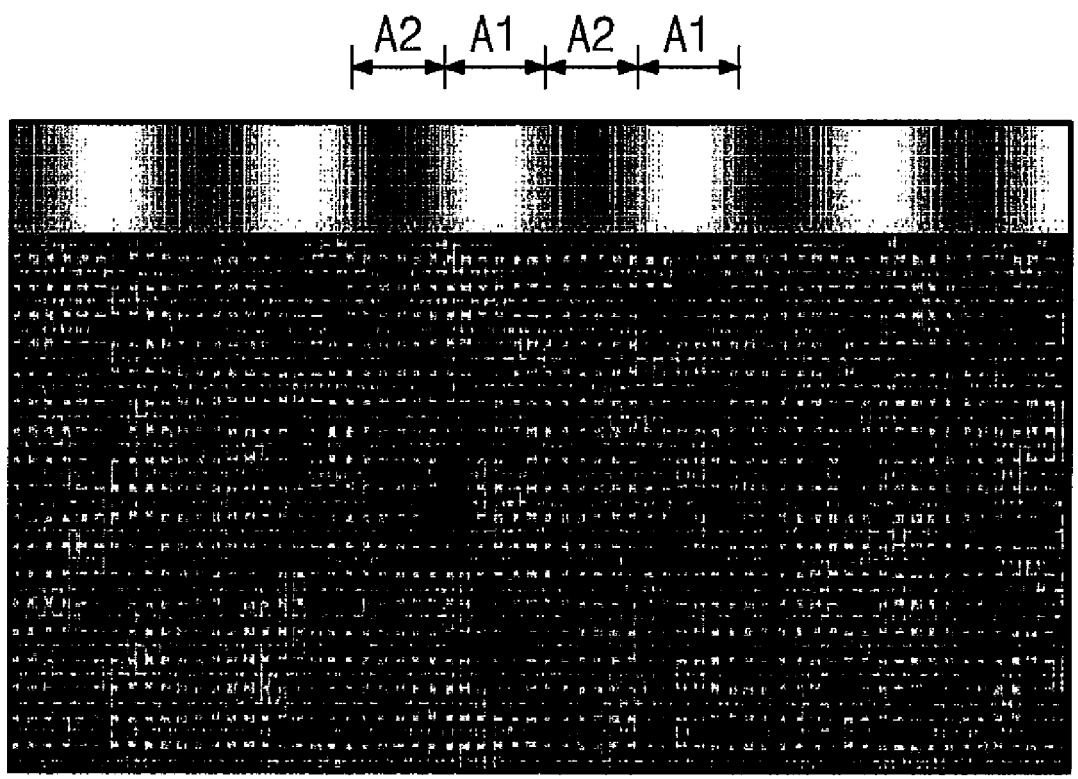
FIG. 5C is a view showing a simulation when the first and second diffusion patterns are employed.

FIG. 5A is a view showing a simulation for the second diffusion patterns 152 causing the contrast inversion, FIG. 5B is a view showing a simulation for the first diffusion patterns that do not cause the contrast inversion, and FIG. 5C is a view showing a simulation when the first and second diffusion patterns are employed.

In detail, FIG. 5A shows the second diffusion patterns 152 having the period random value of 0.1, and the phase random value of 1.2,, and FIG. 5B shows the first diffusion patterns 151 having the period random value of 0.1, and the phase random value of 2.4. FIGS. 5A and 5B show simulation results for the second diffusion patterns 152 and the first diffusion patterns 151 when the second distance d2 (see FIG. 1) between the centers of the two lamps 110 is four times as long as the first distance d1 (see FIG. 1) between the bottom surface of the diffusion plate 120 and the center of the lamp 110.

As shown in FIG. 5A, if the ratio of the phase random value to the period random value is set to 12,, the white portion is concentrated in the first area A1, and the black portion is concentrated in the second area A2. Accordingly, the contrast inversion in which the brightness in the second area A2 becomes higher than the brightness in the first area A1 occurs.

However, as shown in FIG. 5B, if the ratio of the phase random value to the period random value is set to 24,, the white portion is not concentrated in the first area A1, but dispersed into the second area A2. Accordingly, the contrast inversion in which the brightness in the second area A2 becomes higher than the brightness in the first area A1 does not occur.

As shown in FIG. 5C, if the first diffusion patterns 151 that do not cause the contrast inversion and the second diffusion patterns 152 that cause the contrast inversion are formed together on the diffusion plate 120, the brightness difference between the first and second areas A1 and A2 is reduced. Thus, the brightness uniformity of the light that has passed through the diffusion plate 120 can be improved.

Figure 6:
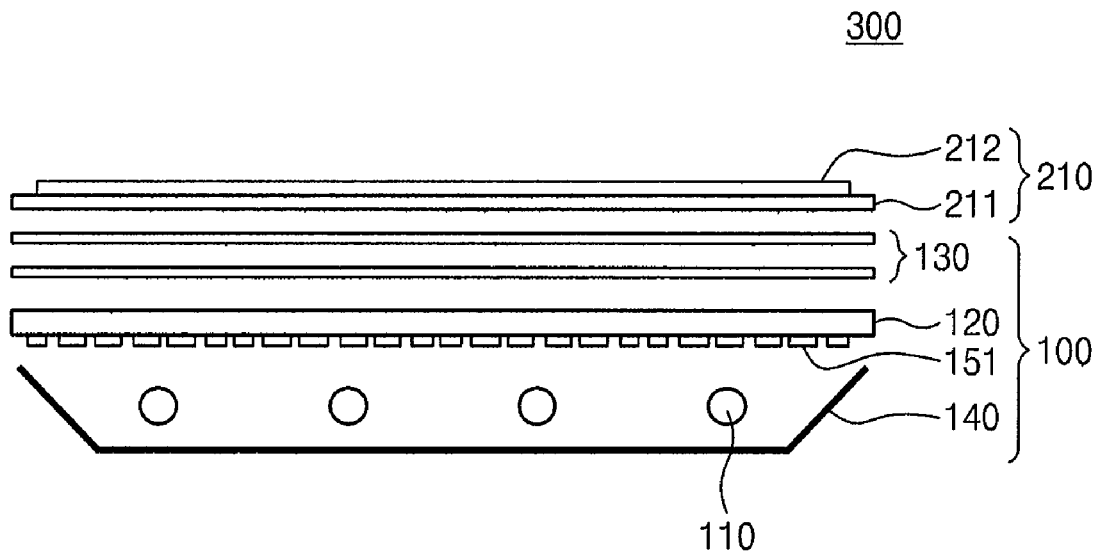
FIG. 6 is a sectional view showing an exemplary embodiment of a liquid crystal display according to the present invention.

FIG. 6 is a sectional view showing an exemplary embodiment of a liquid crystal display according to the present invention. In FIG. 6, the same reference numerals denote the same elements in FIG. 1, and thus detailed descriptions of the same elements will be omitted.

Referring to FIG. 6, a liquid crystal display includes a liquid crystal display panel 210 to display an image using light and a backlight assembly 100 provided below the liquid crystal display panel 210 to supply the light to the liquid crystal display panel 210.

The liquid crystal display panel 210 includes a thin film transistor substrate 211, a color filter substrate 212 facing the thin film transistor substrate 211, and a liquid crystal layer (not shown) interposed between the thin film transistor substrate 211 and the color filter substrate 212.

The thin film transistor substrate 211 includes pixels that are units to display the image and arranged in a matrix. Each pixel includes a thin film transistor and a pixel electrode. The color filter substrate 212 includes color pixels, which represent a predetermined color by light passing through the color pixels, and a common electrode formed on the color pixels while facing the pixel electrode.

The backlight assembly 100 includes the lamps 110, the diffusion plate 120, the optical sheets 130, and the reflective plate 140.

The lamps 110 are spaced apart from each other by a predetermined interval, and arranged in parallel to each other to emit the light. The diffusion plate 120 is provided above the lamps 110 to diffuse and output the light from the lamps 110 through the bottom surface of the diffusion plate 120.

In order to reduce the brightness difference between the first and second areas A1 and A2 of the diffusion plate 120, the first and second diffusion patterns 151 and 152 are alternately arranged on a surface of the diffusion plate 120 (e.g., the surface facing the lamps) along the longitudinal direction of the lamps 110.

The first diffusion patterns 151 have the first density in the first area A1 and the second density lower than the first density in the second area A2. The second diffusion patterns 152 have the third density in the first area A1 and the fourth density lower than the third density in the second area A2. In the present exemplary embodiment, the ratio of the first density to the second density is smaller than the ratio of the third density to the fourth density.

In addition, the ratio of the first density to the second density is higher than a preset threshold ratio, and the ratio of the third density to the fourth density is lower than the threshold ratio. As used herein, "threshold ratio" is a boundary value at which the brightness of the light in the second area A2 starts to become higher than the brightness of the light in the first area A1 when the brightness of the light is measured from above the diffusion plate 120. Accordingly, light in the first area A1 is brighter than the light in the second area A2 in a portion of the diffusion plate 120 having the first diffusion patterns 151, and light in the first area A1 is not as bright as light in the second area A2 in a portion of the diffusion plate 120 having the second diffusion patterns 152.

Light exiting the diffusion plate 120 has a brightness that is about an average of the brightness of the light that has passed through the first diffusion patterns 151 and the brightness of the light that has passed through the second diffusion patterns 152. Accordingly, the brightness difference between the center of the first area A1 and the center of the second area A2 has been measured at about 10, nits. Therefore, the brightness uniformity of the light from the diffusion plate 120 can be improved.

According to the backlight assembly and the display apparatus having the backlight assembly, the diffusion patterns that cause the contrast inversion and the diffusion patterns that do not cause the contrast inversion are alternately arranged on the bottom surface of the diffusion plate along the longitudinal direction of the lamps.

Accordingly, the brightness difference between the first area in which the lamp is positioned and the second area between the two adjacent lamps can be reduced. Therefore, the brightness uniformity of the light emitted from the backlight assembly can be improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   a plurality of lamps arranged to emit light; and
   a diffusion plate provided to diffuse the light from the lamps, the diffusion plate having a first area and a second area, the first area overlapping the lamps and the second area overlapping a space between the lamps,
   wherein the diffusion plate comprises:
   first diffusion patterns formed on the diffusion plate, the first diffusion patterns formed at a first density in the first area and a second density in the second area, the second density being lower than the first density; and
   second diffusion patterns formed on the diffusion plate, the second diffusion patterns formed at a third density in the first area and a fourth density in the second area, the fourth density being lower than the third density, and
   a ratio of the first density to the second density is different from a ratio of the third density to the fourth density.

2. The backlight assembly of claim 1, wherein brightness of light after passing through the second area is lower than brightness of light after passing through the first area where the first and second areas have the first diffusion patterns, and a brightness difference between the second area and the first area is adjusted according to the ratio of the first density to the second density.

3. The backlight assembly of claim 2, wherein the ratio of the first density to the second density is less than the ratio of the third density to the fourth density.

4. The backlight assembly of claim 1, wherein brightness of light exiting the diffusion plate after passing through the second area is higher than brightness of light exiting the diffusion plate after passing through the first area where the first and second areas have the second diffusion patterns, and a brightness difference between the second area and the first area is adjusted according to a ratio of the third density to the fourth density.

5. The backlight assembly of claim 4, wherein the ratio of the first density to the second density is less than the ratio of the third density to the fourth density.

6. The backlight assembly of claim 1, wherein a density of each of the first and second diffusion patterns is adjusted according to a period random value and a ratio of a phase random value to the period random value in each of the first and second diffusion patterns.

7. The backlight assembly of claim 6, wherein the density of each of the first and second diffusion patterns is defined as an equation, $$Y = \sin\left(\frac{2\pi}{R_{period}}(x - R_{phase})\right),$$

in which the $R_{period}$ denotes the period random value and the $R_{phase}$ denotes the phase random value.

8. The backlight assembly of claim 7, wherein the ratio of the phase random value to the period random value for the first diffusion pattern is higher than a threshold ratio, and the ratio of the phase random value to the period random value for the second diffusion pattern is lower than the threshold ratio.

9. The backlight assembly of claim 8, wherein the threshold ratio is a boundary value at which the brightness of light that passed through the second area becomes higher than the brightness of light that passed through the first area.

10. The backlight assembly of claim 1, wherein the first and second diffusion patterns are alternately printed on a surface of the diffusion plate facing the lamps, along a longitudinal direction of the lamps.

11. The backlight assembly of claim 10, wherein the first and second diffusion patterns comprise a white ink comprising titanium dioxide ($TiO_2$).

12. The backlight assembly of claim 1, wherein a distance between centers of two adjacent lamps of the lamps is at least four times as long as a distance between a center of each lamp and the diffusion plate.

13. A display apparatus comprising:
a display panel which displays an image using light; and
a backlight assembly provided behind the display panel to supply the light to the display panel,
wherein the backlight assembly comprises:
a plurality of lamps arranged to emit the light; and
a diffusion plate provided to diffuse the light from the lamps, the diffusion plate having a first area and a second area, the first area overlapping the lamps and the second area overlapping a space between the lamps,
the diffusion plate comprises:
first diffusion patterns formed on the diffusion plate, the first diffusion patterns having a first density in the first area and a second density in the second area, the second density being lower than the first density; and
second diffusion patterns formed on the diffusion plate, the second diffusion patterns formed at a third density in the first area and a fourth density in the second area, the fourth density being lower than the third density, and
a ratio of the first density to the second density is different from a ratio of the third density to the fourth density.

14. The display apparatus of claim 13, wherein brightness of light after passing through the second area is lower than brightness of light after passing through the first area where the first and second areas have the first diffusion patterns, and a brightness after passing through second area is higher than brightness of light after passing through the first area where the first and second areas have the second diffusion patterns.

15. The display apparatus of claim 14, wherein the ratio of the first density to the second density is smaller than the ratio of the third density to the fourth density.

16. The display apparatus of claim 13, wherein a density of each of the first and second diffusion patterns is adjusted according to a period random value and a ratio of a phase random value to the period random value in each of the first and second diffusion patterns.

17. The display apparatus of claim 16, wherein the density of each of the first and second diffusion patterns is defined as an equation, $$Y = \sin\left(\frac{2\pi}{R_{period}}(x - R_{phase})\right),$$

in which the $R_{period}$ is the period random value and the $R_{phase}$ is the phase random value.

18. The display apparatus of claim 17, wherein the ratio of the phase random value to the period random value for the first diffusion pattern is higher than a threshold ratio,
the ratio of the phase random value to the period random value for the second diffusion pattern is lower than the threshold ratio, and
the threshold ratio is a boundary value at which the brightness of light that passed through the second area becomes higher than the brightness of light that passed through the first area.

19. The display apparatus of claim 13, wherein the first and second diffusion patterns are alternately printed on a surface of the diffusion plate facing the lamps, along a longitudinal direction of the lamps.

20. The display apparatus of claim 13, wherein a distance between centers of two adjacent lamps of the lamps is at least four times as long as a distance between a center of each lamp and the diffusion plate.

* * * * *